Feb. 12, 1946. J. A. STADTFELD 2,394,818
HOLLOW CONDUIT AND A METHOD OF MAKING THE SAME
Filed April 14, 1942
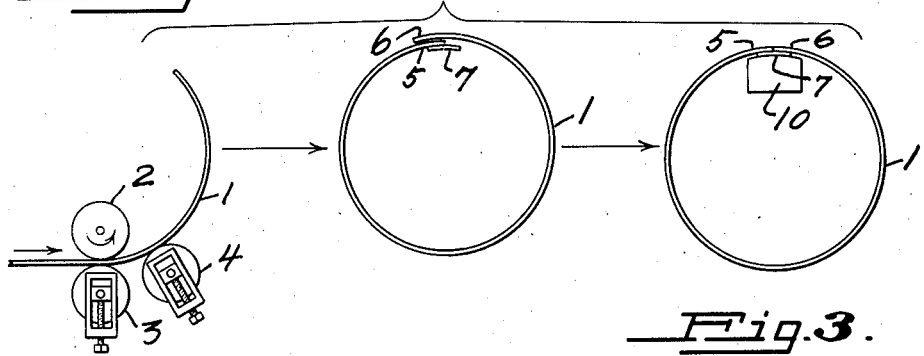
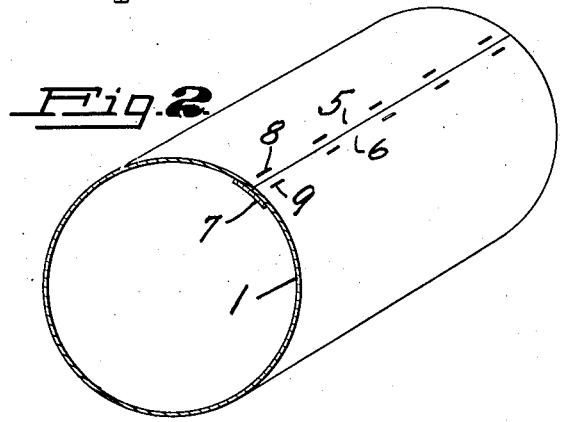
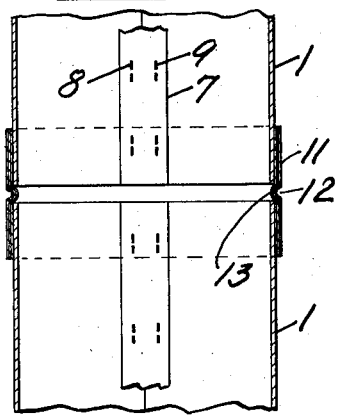
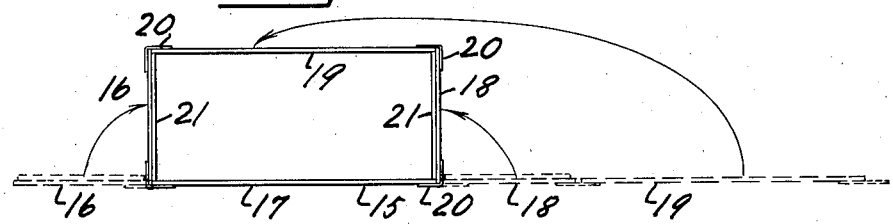
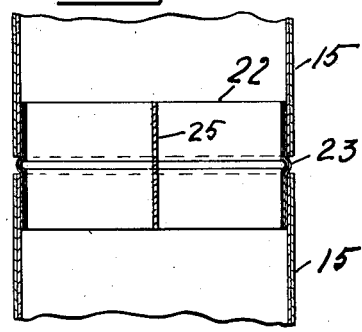
INVENTOR,
JACOB A. STADTFELD.
BY
*A. Schapp*
ATTORNEY.

Patented Feb. 12, 1946

2,394,818

UNITED STATES PATENT OFFICE 2,394,818

HOLLOW CONDUIT AND A METHOD OF MAKING THE SAME

Jacob A. Stadtfeld, San Francisco, Calif., assignor to Harry A. Dutton, Jr., San Francisco, Calif.

Application April 14, 1942, Serial No. 438,882

2 Claims. (Cl. 138—76)

The present invention relates to improvements in hollow conduits and a method of making the same and has particular reference to stove pipes, furnace pipes and the like, which are usually made of rather large diameter and of light-weight material and the principal functions of which are to conduct gases in the absence of any considerable pressure, such as heated air or products of combustion.

Conduits of this type at the present time are usually made of relatively light sheet metal which is often covered with flexible sheets of asbestos for insulation purposes.

In the present emergency sheet metal is difficult to obtain and it is the principal object of the present invention to make asbestos available for the manufacture of pipes of this character.

Asbestos is available on the open market in the form of asbestos millboard, that is, in the form of relatively stiff sheets resembling ply-wood in their resistance to bending stresses, and normally not adapted for bending into tubular form without wrinkling on their inner faces and rupturing on their outer faces.

I have found, however, that if such asbestos millboard is subjected to a more or less conventional rolling process, whereby it is turned uniformly throughout its length and to a relatively large diameter it is adapted to be shaped permanently into annular form, without any injury to the inner and outer surfaces thereof.

I have further found that the material when thus rolled into annular form, has a certain resiliency and elasticity so that when it is turned to a diameter slightly less than the desired diameter and is expanded to the desired diameter thereafter it will tend to contract and cause confronting edges thereof to bear upon one another with a certain amount of pressure which facilitates the joining of the said edges.

When tubes of this character are provided with a suitable coating of hardening material for filling the pores on the inside and on the outside, they assume an almost metallic character and are not only impervious to gases but form excellent insulators and are exceedingly well adapted to take the place of metallic conduits heretofore employed.

Conduits of this type may also be made in rectangular form, in which case the rolling action is, of course, omitted and the millboard is used in its original form.

It is the principal object of the present invention to provide conduits made of asbestos millboard and to provide a method of making the same.

Further objects and advantages of my invention will appear as the specification proceeds.

The preferred forms of my invention are illustrated in the accompanying drawing in which Figure 1 shows a method of making a circular conduit of asbestos millboard;

Figure 2, a section isometric view of a finished tube section;

Figure 3, a longitudinal section through a joint between two adjacent conduit sections;

Figure 4, an end view of a rectangular conduit section made in accordance with my invention, a blank for making the same being shown in dotted lines; and Figure 5, a longitudinal section through a joint between two adjacent rectangular pipe sections.

While I have shown only the preferred forms of my invention, it should be understood that various changes and modifications may be made within the scope of the claims attached hereto without departing from the spirit of the invention.

Referring to the drawing in detail, a sheet 1 of asbestos millboard is fed, by any suitable machinery, not illustrated, between two feed rollers 2 and 3 against a third roller 4 which bends the sheet into cylindrical form, preferably on a diameter slightly smaller than the diameter desired for the completed conduit so that when the rolling action is completed, the sheet of asbestos millboard assumes the substantially cylindrical form shown as the second step in Figure 1, with the edges 5 and 6 overlapping.

A strip 7, preferably made of the same material, is then attached by any suitable means, such as stapling indicated at 8, to one of the overlapping edges, in such a manner that a section of the strip projects beyond the edge. Next the conduit is expanded, and upon release the edge 6 is made to seat upon the projecting portion of the strip 7, which forms a ledge, and the resiliency of the material will tend to urge the edge 6 upon the ledge and into contact with the edge 5. The edge 6 may then be secured upon the ledge by any suitable means, as by the staples 9 shown in Figure 2. A suitable anvil or mandrel 10 may be used to facilitate this operation.

The entire section is now dipped into a suitable tank containing a hardening solution. This solution may be of any desired composition, depending upon the character of coating desired. My preferred solution comprises a mixture in the proportions of one-half a gallon of silicate of soda, one-half a gallon of water and one pound of china clay. The tube section is allowed to remain in this solution for about four minutes, is then removed, drained and dried at about 200 degrees Fahrenheit for a period of four hours.

For joining two sections I preferably use a collar 11 which may be similarly prepared and coated, or which may be made in laminations as indicated in Figure 3. The collar is provided with an annular groove 12 forming a bead 13 on the inside of the collar. Two pipe sections 1 are telescoped into the collar from opposite ends as shown in Figure 3 to abut against the bead, and the groove 12 may be used to accommodate a supporting wire, not shown, if the conduit is to be supported from a ceiling or the like, as is the usual practice, where the conduit is used as a furnace pipe in a basement.

In the form shown in Figures 4 and 5 the conduit 15 is rectangular in form and is preferably made out of a blank shown in dotted lines. This blank comprises four flat sections of asbestos millboard, indicated at 16, 17, 18 and 19 respectively, alternating sections 16—18 and 17—19 being of similar dimensions. The blank is adapted for spreading on a flat surface, which form is particularly adapted for stacking and shipping, and the four sections are slightly spaced from one another, substantially by the thickness of the material used. They are connected together by suitable flexible binders 20, such as muslin tape, the binders serving as hinges and allowing the sheets to be swung into rectangular relationship.

The spacing between the sheets of asbestos millboard allows one section to set upon the margin of the adjacent section when swung into rectangular position with respect thereto. Two opposing sections are provided with foreshortened reinforcing sheets 21 which serve as abutments for the other two sections when the four sections are assembled in rectangular form as shown in Figure 4. The two free edges are joined in a similar manner by a suitable tape.

To assemble from a blank, the latter is spread on a flat surface as shown in dotted lines in Figure 4. The section 16 is then swung upward, with its lower edge bearing against the edge of section 17 and the reinforcing sheet 21 bearing on the top surface of section 17. Next the section 18 is swung upward in a similar manner and the section 19 is swung into position to form the top. When the pipe is thus assembled, the two side sections 16 and 18 bear against the end edges of sections 17 and 19; and the top and bottom sections 17 and 19 bear against the abutments 21. The binders or tapes 20 hold the different sections in assembled relation.

The entire pipe section is now dipped, drained and dried in the manner previously described.

For joining two sections of the rectangular type I preferably use a rectangular collar 22, which may be made in a similar manner. The two sections 15 are telescoped on the collar to come up against an annular bead 23 formed by grooving the asbestos material.

The coating hardens the surface of the asbestos, seals the pores, becomes insoluble when dried, prevents the softening and distorting of the asbestos in the presence of moisture, improves the insulating characteristics of the asbestos and is highly heat-resistant.

The collars used for joining the pipe sections may be made of thinner laminations drawn through a bath for applying the solution and may be readily grooved while still wet.

To guard against sagging of the wider walls of the rectangular tubes, a longitudinal vane or partition 25 may be used in the center of the collar 22.

I claim:

1. A plain sheet of asbestos millboard shaped to form an annular hollow conduit and tensioned to have opposing edges bear upon one another under pressure, a strip of the same material disposed adjacent to said opposing edges, and means for securing the latter upon the strip.

2. A plain strip of asbestos millboard shaped to form an annular hollow conduit and tensioned to have opposing edges bear upon one another under pressure, a strip of similar material disposed adjacent to said opposing edges, and means for securing the latter upon the strip.

JACOB A. STADTFELD.